United States Patent Office
3,324,112
Patented June 6, 1967

3,324,112
N-ALKYLENE GUANIDINES
Gerhard F. Ottmann, Hamden, and Haywood Hooks, Jr., West Haven, Conn., assignors to Olin Mathieson Chemical Corporation, New Haven, Conn., a corporation of Virginia
No Drawing. Filed Oct. 28, 1963, Ser. No. 319,521
12 Claims. (Cl. 260—239)

This invention relates to a new class of organo-nitrogen compounds having unusual biological activity. More particularly, it relates to a series of N-alkylene guanidines which are effective chemosterilants in the combating of harmful insects.

The principal object of this invention is to prepare a series of heretofore unknown N-alkylene guanidines. Another object is to provide a direct and efficient process for the preparation of the aforementioned derivatives in good purity.

Another object is to provide a new class of chemosterilants useful for controlling the propagation of various harmful insects species. Still another object of this invention is to prepare a number of insect sterilant compositions having N-alkylene guanidines as the principal active ingredient.

These objects have been accomplished in accordance with this invention. A series of N-alkylene guanidines has been prepared which can be represented by the general formula:

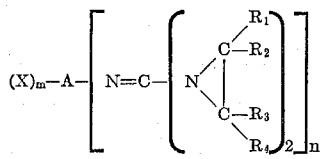

wherein A is an aliphatic or substituted aliphatic group having from 2–10 carbon atoms and preferably a straight chain hydrocarbon group, a cyclohexane ring or an aromatic ring preferably a benzene ring; and wherein X is selected from the class consisting of hydrogen, lower alkyl, halogen and nitro groups; and wherein $m$ is an integer from 0 to 3; $n$ is an integer from 1 to 3; and wherein $R_1$, $R_2$, $R_3$ and $R_4$ are independently selected from the class consisting of a hydrogen atom, an alkyl group, e.g., methyl, ethyl, propyl, and butyl, and an aryl group such as a phenyl group.

An efficient process for the preparation of the guanidines (I) is herein provided, and these organo-nitrogen compounds can be readily prepared and isolated in high purity in accordance with this process.

It has been found that the N-alkylene guanidines (I) are useful sterilizing agents in the controlling of various insect species. Naturally, they are more potent chemosterilants when utilized in concentrated form, but as a practical matter it is preferred to utilize them admixed with inert diluents wherein not more than about one percent of active ingredient is present. They are effective as sterilizing agents even when used in concentrations as low as 0.01%. Thus a number of insect sterilant compositions can be prepared having the guanidines (I) as the principal active ingredient.

The substituted guanidines disclosed and claimed herein are prepared by the reaction of ethylenimine and its homologs with various isocyanide dichlorides in accordance with the following equation:

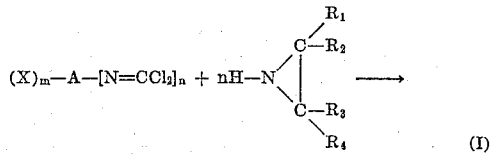

wherein A, X, $m$, $n$, $R_1$, $R_2$, $R_3$ and $R_4$ in the above equation are as previously defined.

A wide variety of isocyanide dichlorides can be used as intermediates in the preparation of the guanidines (I). For example, alkyl monoisothiocyanates can be chlorinated in an etheral medium at about 0° C. to provide alkyl isocyanide dichlorides suitable for reaction with ethylenimine and its homologs. Various halogen substituted alkyl isocyanide dichlorides, prepared by the treatment of carbamyl halides with chlorine at about 160° C. as described in German Patent 1,141,278 are also suitable intermediates.

A series of bis(isocyanide dichlorides) having the formula $Cl_2C=N-R=NCCl_2$, wherein R is an alkylene group, a substituted alkylene group or a cyclohexyl group, are also valuable intermediates in the practice of this invention. These derivatives are prepared by the reaction of diisocyanates with a molar excess of phosphorus pentachloride in a phosphorus oxychloride solvent as described in copending application, Ser. No. 319,573, now U.S. Patent 3,267,144.

Also, isonitrile dihalides of the formula $Ar-N=CX_2$ (wherein Ar is an aromatic moiety and X is Cl or Br) can be used as intermediates in the preparation of guanidines included in the Formula I. These derivatives may be prepared by a variety of methods such as, e.g., by the chlorination of aromatic isothiocyanates (Sell et al., Berichte der Deutschen Chem. Ges., vol. 7, p. 1228, 1874), by fixing halogen on isonitriles [J. V. Nef Liebigs Annalen der Chemie., vol. 270, 267 (1892) and vol. 280, 291 (1894)] and by chlorination of formanilides in thionyl chloride according to German Patent 1,094,737. Specific compounds of this nature which can be used herein are phenylisonitrile dichloride, 4-chlorophenylisonitrile dichloride, 2-chlorophenyl isonitrile dichloride, 2,4-dichlorophenylisonitrile dichloride, 4-nitrophenylisonitrile dichloride, 4-bromophenylisonitrile dichloride, 2-methyl-4-chlorophenylisonitrile dichloride, 4-chloro-naphthyl-(1)-isonitrile dichloride, phenylene-(1,4)-bis isonitrile dichloride and the corresponding dibromide.

Guanidines of the Formula I wherein $n$ is 3 can be prepared for example by reacting benzene tris(isocyanide dichlorides) with ethylenimine and its homologs. These intermediates are readily obtained by hydrogenation of trinitrobenzene to provide triaminobenzene, reacting the amine derivative with formic acid to provide the corresponding formanilide and finally chlorinating this latter derivative to obtain the isocyanide dichloride.

Ethylenimine and 2-methyl-ethylenimine are the preferred imines to be used in the practice of this invention. However, other imines which can be used to prepare guanidines having the Formula I include 2,2-dimethyl-ethylenimine, 2-phenyl-ethylenimine, 2,3-dimethyl-ethylenimine, 2,3-diphenyl-ethylenimine, 2,2,3-triethyl-ethylenimine, and 2,2-diethyl-3-n-propyl-ethylenimine.

The reaction of the isocyanide dichlorides with the aforementioned ethylenimines is best performed in the presence of an inert solvent or diluent. The desired guanidine derivatives can be prepared and isolated in good purity in a variety of solvents. For example, suitable solvents which can be utilized in the preparation of N-alkylene guanidines include toluene, benzene, ether and the like.

The preparation of the guanidines should be performed at reaction temperatures below about 30° C., and a preferred reaction tempertaure of about 0° C. should be employed.

An acid acceptor is required in the process of this invention. A molar excess of the imine involved can be used in which event the excess will serve as an acid acceptor and take up the by-product hydrogen chloride. However, the preferred method is to eliminate the use of costly excess ethylenimine by the use of another acid acceptor. In this manner, only the theoretical amount of ethylenimine need be employed in the process. For example, other suitable acid acceptors which may be used in the process are tertiary amines, such as triethylamine, and other basic compounds such as pyridine, N-ethyl morpholine, etc.

The following examples will serve to illustrate the preparation of various N-alkylene guanidines in accordance with this invention. These examples are illustrative only, and they are not to be construed as limiting the scope of this invention.

*Example 1*

Phenylene-1,4-bis(isocyanide dichloride) was prepared by the reaction of phenylene-1,4-bis(formamide) with thionyl chloride and sulfuryl chloride as described in German Patent 1,094,737.

A solution of 13.5 g. of phenylene-1,4-bis(isocyanide dichloride) in 100 mls. of dry toluene was added dropwise to a stirred solution of 9.5 g. of ethylenimine and 22.2 g. of triethylamine dissolved in 150 ml. of toluene. The exothermic reaction is controlled by means of an ice bath to maintain a reaction temperature of 15° C. After addition was completed, the reaction mixture was stirred for several hours at room temperature. Precipitated triethylamine hydrochloride was removed by filtration from the reaction mixture, and the filtrate was concentrated to dryness. The white powdery residue was recrystallized from heptane to yield crystals melting at 124°–125° C. The following analytical data revealed that p-phenylene bis[N,N'-di(ethylene)guanidine] had been obtained. Yield: 62%.

*Analysis.*—Calcd. for $C_{16}H_{20}N_6$: C, 64.8; H, 6.77; N, 28.4. Found: C, 64.72; H, 7.23; N, 28.5.

*Example 2*

An amount of 86 g. of toluene-2,4-diisothiocyanate was dissolved in 80 ml. of chloroform and chlorinated by passing chlorine into the solution for 7 hours at 15–20° C. and for 16 hours at the reflux temperature of chloroform. The solvent and $SCl_2$ were removed by distillation and the residue was recrystallized twice from pentane. There was obtained 73 grams of a crystalline product melting at 50–51° C. The following analytical data revealed that 3-chlorotoluene-4,6-bis(isocyanide dichloride) had been obtained. Yield: 60%.

*Analysis.*—Calcd. for $C_9H_5Cl_5N_2$: C, 33.95; H, 1.6; N, 8.78; Cl, 54.6. Found: C, 34.08; H, 2.00; N, 8.47; Cl, 54.2.

A solution of 12.5 g. of 3-chlorotoluene-4,6-bis(isocyanide dichloride) in 300 mls. of dry toluene was added dropwise to a stirred solution of 7.5 g. of ethylenimine and 17.3 g. of triethylamine dissolved in 75 mls. of toluene as described in Example 1. Upon evaporation of the toluene solvent, a yellow oil was obtained which was recrystallized from hexane to provide crystals melting at 84–85° C. The following analytical data revealed that 5 - chlorotolylene - 2,4 - bis[$N,N_2$ - di(ethylene)guanidine] had been obtained.

*Analysis.*—Calcd. for $C_{17}H_{21}ClN_6$: C, 59.1; H, 6.1; N, 24.35; Cl, 10.3. Found: C, 59.3; H, 6.2; N, 23.98; Cl, 11.6.

*Example 3*

To a mixture of 143 g. of thionyl chloride and 52.5 g. of sulfuryl chloride was added dropwise 54 g. of o-fluoroformanilide while maintaining a reaction temperature of 15–20° C. After addition was completed, the mixture was stirred for three hours at room temperature and four hours at reflux temperature. After removal of the solvent and excess $SO_2Cl_2$, the mixture was distilled yielding 48.1 g. of a colorless liquid, B.P. 86° C./12 mm., $n_D^{25}$ 1.5499. Analysis revealed that 2-fluorophenyl isocyanide dichloride had been obtained.

*Analysis.*—Calcd. for $C_7H_4NCl_2F$: Cl, 37.0. Found: Cl, 36.7.

An amount of 19.8 g. of 2-fluorophenyl isocyanide dichloride was dissolved in 100 mls. of dry toluene, and this solution was added with stirring and cooling to 9.5 g. ethylenimine and 22 g. of triethylamine in 100 mls. of dry toluene. After stirring overnight at room temperature, triethylamine hydrochloride was separated from the mixture, and the remaining solution was distilled yielding a colorless liquid, B.P. 92–93° C./0.05 mm., $n_D^{25}$ 1.5662. Analysis revealed that o-fluorophenyl-N,N'-di(ethylene)guanidine had been obtained.

*Analysis.*—Calcd. for $C_{11}H_{12}N_3F$: C, 64.4; H, 5.68; N, 20.30. Found: C, 65.1; H, 5.45; N, 20.33.

*Example 4*

In accordance with the procedure described in Angewandte Chemie, 74, 863 (1962), m-nitrophenyl isocyanide dichloride was prepared by the reaction of m-nitroformanilide with thionyl chloride and sulfuryl chloride.

Then 21.9 g. of m-nitrophenyl isocyanide dichloride was reacted with 99.5 g. of ethylenimine and 22.2 g. of triethylamine using the procedure of Example 3. A solid product, recrystallizable from hexane and melting at 83–84° C. was obtained. The following analytical data revealed that m-nitrophenyl-N,N'-di(ethylene)guanidine had been obtained.

*Analysis.*—Calcd. for $C_{11}H_{12}N_4O_2$: C, 56.9; H, 5.18; N, 24.1. Found: C, 56.85; H, 6.00; N, 23.88.

*Example 5*

In accordance with the procedure described in Angewandte Chemie, 74, 863 (1962), p-chlorophenyl isocyanide dichloride was prepared by the reaction of p-chloroformanilide with thionyl chloride and sulfuryl chloride.

Then a solution of 43.1 g. of ethylenimine and 111 g. of triethylamine in 250 mls. of benzene was added dropwise to a solution of 87.0 g. of p-chlorophenyl isocyanide dichloride in 250 mls. of benzene at a temperature of 20–30° C. After reaction, triethylamine hydrochloride was removed by filtration, and the filtrate was concentrated to afford 64 g. of a liquid residue. Upon recrystallization from heptane, a crystalline product melting at 45–47° C. was isolated. The following analytical data revealed that p-chlorophenyl-N,N'-di(ethylene)guanidine had been obtained

*Analysis.*—Calcd. for $C_{11}H_{12}ClN_3$: C, 59.6; H, 5.42; N, 18.9; Cl, 16.0. Found: C, 59.6; H, 5.9; N, 18.5; Cl, 16.6.

*Example 6*

A mixture of 186 g. (0.90 mole) of $PCl_5$ and 200 mls. of $POCl_3$ was placed in a one-liter reaction flask equipped with stirrer. Then 50 g. (0.30 mole) of hexamethylene-1,6-diisocyanate was added dropwise over a one hour period during which time the temperature of the reaction mixture rose from 24° C. to 29° C. The mixture was stirred overnight at room temperature. Finally, the mixture was heated for one hour at reflux temperature with stirring. Excess $PCl_5$ was removed from the reaction mixture by filtration. The $POCl_3$ was recovered from the mixture by distillation. The resulting liquid residue was dissolved in ether, filtered and distilled. A colorless liquid having a boiling point of 118°–120° C./0.75 mm. and $n_D^{26}$ 1.5020 was obtained. The following analytical data revealed that hexamethylene-1,6-bis(isocyanide dichloride) had been obtained.

*Analysis.*—Calcd. for $C_8H_{12}N_2Cl_4$: C, 34.58; H, 5.32; N, 10.07; Cl, 51.2. Found: C, 34.73; H, 4.62; N, 9.95; Cl, 51.3.

To 8 g. of hexamethylene-1,6-bis(isocyanide dichloride) in 50 ml. of dry ether was added a solution of 5.5 g. of ethylenimine and 12.87 g. of triethylamine in 100 ml. of dry ether dropwise over a period of 90 minutes. After stirring overnight, triethylamine hydrochloride was filtered from the reaction mixture. The filtrate was evaporated to dryness, and the residual white powder was recrystallized from n-hexane providing a crystalline product melting at 220° C. The following analytical data revealed that hexamethylene-1,6-bis[N,N'-di(ethylene)guanidine] had been obtained.

*Analysis.*—Calcd. for $C_{16}H_{28}N_6$: C, 63.2; H, 9.27; N, 27.6. Found: C, 61.9; H, 9.66; N, 26.87.

*Example 7*

A solution of 13.5 g. of phenylene-1,4-bis(isocyanide dichloride) in 75 ml. of ether was added dropwise with stirring to a solution of 12.5 g. of propylenimine and 22.2 g. of triethylamine in 100 ml. of dry ether at 20–25° C. After stirring for 15 additional hours the quantitative amount of $(C_2H_5)_3N \cdot HCl$ was separated by filtration, and the solvent removed from the filtrate. The oily residue was dissolved in hot hexane, and an insoluble wax portion was removed by filtration leaving a clear hexane filtrate. This filtrate was cooled, and an oily layer precipitated from solution. This oily phase was separated from the clear filtrate, and any residual hexane was removed from the oil by warming to 30° C. in vacuo. A light yellow oil was thus obtained and identified as substantially pure p-phenylene bis[N,N'-di(propylene)guanidine].

As mentioned in the preceding discussion, it has been found that the guanidines having the general Formula I are characterized by a high degree of biological activity, and they are particularly effective as chemosterilants in the controlling of harmful insects. Although the compounds of this invention can be used alone as chemosterilants, it is more practical to utilize them in a dispersed form admixed with a major amount of a suitable carrier or extending agent. A variety of insect sterilant compositions can be prepared containing these compounds as the principal active ingredient.

The term "dispersed" as used herein is used in a broad sense. When it is said that the guanidines having the Formula I are dispersed, it means that the particles may be molecular in size and held in true solution in a suitable solvent. It means further that the particle may be colloidal in size and dispersed through a liquid phase in the form of suspension or emulsions or in the form of particles held in suspension by wetting agents. The compounds may also be dispersed and admixed in solid carriers so as to form powders, dusts or granular preparations.

The term "extending agent" as used in this specification and claims includes any and all of those carriers or diluents in which the compounds of this invention are dispersed. For example, it includes the solvents of a true solution, and liquid phase of suspensions and emulsions and the solid carriers of a powder or dust.

The substituted guanidines of the general Formula I may be combined with a large number of diluents to give sterilant formulations which can be applied to harmful insects either topically or in the form of food.

For example, the guanidines of this invention can be formulated with various carriers to form "baits" which, when fed to insects, prove to be excellent insect sterilant compositions. The following procedure will serve to illustrate how the compounds of this invention can be formulated into baits suitable for sterilizing insects.

A solution of 0.1 g. of p-phenylene bis[N,N'-di(ethylene)guanidine] in 50 ml. of chloroform was prepared. This solution was blended with 100 g. of granulated sucrose, and after a thorough mixing of the solution with the sucrose, the solvent was evaporated. The residual solid material was ground in a mortar. This bait was fed to twenty-four hour old houseflies for a period of five days. On the succeeding two days, eggs were collected from a prepared oviposition site and incubated for 24 hours at 75° F. These eggs were then inspected under a binocular microscope for "hatching." All "unhatched" eggs are considered non-viable or sterile, and the data was recorded as percent sterile eggs. Under the conditions of this procedure, 99% of the eggs were non-viable.

Similarly, another bait containing 0.5% of 5-chlorotolylene-2,4-bis[N,N'-di(ethylene)guanidine] was utilized against houseflies in the same manner. Again 98% of the eggs checked were found to be non-viable. Baits containing m-nitrophenyl - N,N'-di(ethylene)guanidine and p-chlorophenyl-N,N'-di(ethylene)guanidine were also effective insect sterilant compositions.

A number of other carriers may be employed as extending agents in baits in addition to the sugar carriers described above. Examples of other carriers include corn grits, limestone, pumice, corn cob grits of varying particle sizes, walnut shell aggregate, a mixture of powdered eggs—powdered milk—sucrose, talc, pyrax granules, concrete sand, etc. When the carrier is not sugar, it is advantageous to add about 5 to 50% by weight of sugar to the carrier as a lure.

The compounds of the Formula I can also be admixed with a major amount of various solid extending agents to provide pest sterilant formulations which can be applied as powders or dusts. Dry extenders suitable for such use include kaolin, calcium carbonate, talc, Barden's clay, Attapulgus clay and others. These insect sterilant compositions may be utilized in the dry form or, if so desired, a wetting agent may be used to prepare wettable powders.

The chemosterilants of this invention may also be used to combat harmful insects in the form of emulsions. These emulsions can be prepared by dissolving the active ingredient in a solvent which is not miscible with water, and adding water to the solution in the presence of an emulsifying agent. Emulsion formulations of this nature can be readily sprayed in desired locations.

The chemosterilants described herein can also be dispersed in an inert carrier such as water to provide useful suspension formulations. Usually a surface active agent can be advantageously used in these formulations, but this is not a necessity. For example, 5-chlorotolylene-2,4-bis[N,N'-di(ethylene)guanidine] was ball milled with water to provide a very fine colloidal suspension containing 0.1% by weight of active ingredient. Thirty ml. of this suspension was sprayed on houseflies in a small cage. The flies were left in this cage for one hour before they were transferred to a larger cage and fed milk. Subsequently, eggs were collected from a prepared oviposition site and incubated for 24 hours at 75° F. These eggs were inspected under a microscope for hatching, and 92% of the eggs were found to be non-viable.

Of course, the N-alkylene guanidines can also be dissolved in various solvents useful in the spraying of harmful insects. Suitable solvents include: acetone, chlorinated hydrocarbons such as chloroform, etc., dimethylacetamide, dimethylformamide and others.

The chemosterilants described herein may be used in the control of a wide variety of harmful insects including houseflies, latrine flies, the screw worm fly, the stable fly, vinegar fly, the Mediterranean fruit fly, the Mexican fruit fly, the Oriental fruit fly, the boll weevil, eye gnats, and others. They may also be used in sterilizing compositions applicable in the control of the malarial mosquito

What is claimed is:

1. N-alkylene guanidines having the formula

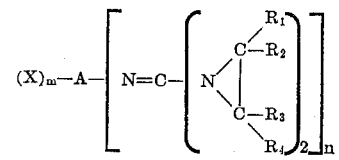

wherein A is selected from the class consisting of straight chain hydrocarbon groups having from 2–10 carbon atoms, a cyclohexane ring and a benzene ring; wherein X is selected from the class consisting of hydrogen, a halogen atom, a lower alkyl group and a nitro group; wherein $m$ is an integer from 0–3; wherein $n$ is an integer from 1–3; and wherein $R_1$, $R_2$, $R_3$, and $R_4$ are each independently selected from the class consisting of a hydrogen atom, a lower alkyl group and a phenyl group.

2. The compounds of claim 1 wherein $R_1$, $R_2$, $R_3$ and $R_4$ represent hydrogen atoms.

3. The compounds of claim 1 wherein $R_1$, $R_2$, and $R_3$ represents hydrogen atoms and $R_4$ represents a methyl group.

4. p-Phenylene bis[N,N'-di(propylene)guanidine].

5. N-ethylene guanidines having the formula

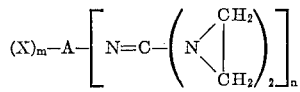

wherein A is a straight chain hydrocarbon group having from 2–10 carbon atoms; wherein X is selected from the class consisting of hydrogen, halogen atoms, a lower alkyl group and a nitro group; wherein $m$ is an integer from 0–3; and wherein $n$ is an integer from 1–3.

6. Hexamethylene - 1,6 - bis[N.N' - di(ethylene)guanidine].

7. N-ethylene guanidines having the formula

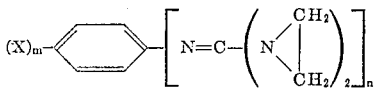

wherein X is selected from the class consisting of hydrogen, a halogen atom, a lower alkyl group and a nitro group; wherein $m$ is an integer from 0–3; and wherein $n$ is an integer from 1–3.

8. p-Phenylene bis[N,N'-di(ethylene)guanidine].

9. 5 - chlorotolylene-2,4 - bis[N.N'-di(ethylene)guanidine].

10. o-Fluorophenyl-N,N'-di(ethylene)guanidine.

11. m-Nitrophenyl-N,N'-di(ethylene)guanidine.

12. p-Chlorophenyl-N,N'-di(ethylene)guanidine.

References Cited

UNITED STATES PATENTS 3,201,443   8/1965   Malz et al. _____ 260—566
3,220,848   11/1965   Himmelmann et al. __ 260—239

ALEX MAZEL, *Primary Examiner.*
ALTON D. ROLLINS, *Assistant Examiner.*

UNITED STATES PATENT OFFICE
CERTIFICATE OF CORRECTION

Patent No. 3,324,112　　　　　　　　　　　　June 6, 1967

Gerhard F. Ottmann et al.

It is certified that error appears in the above identified patent and that said Letters Patent are hereby corrected as shown below:

Column 1, line 35, right-side of the formula insert (I); column 2, line 6, for "etheral" read -- ethereal --; line 35, for "chlorophenyl isonitrile" read -- chlorophenylisonitrile --; column 3, line 59, for "N,N$_2$" read -- N, N´ --; column 4, line 13, for "H, 5.68" read -- H, 5.86 --; line 22, for "99.5 g." read -- 9.5 g. --.

Signed and sealed this 24th day of June 1969.

(SEAL)
Attest:

Edward M. Fletcher, Jr.　　　　　　　　　WILLIAM E. SCHUYLER, JR.
Attesting Officer　　　　　　　　　　　　　Commissioner of Patents